United States Patent [19]

Smith et al.

[11] Patent Number: 5,047,915

[45] Date of Patent: Sep. 10, 1991

[54] UNRESTRICTED FREQUENCY CONVERTER FOR UNBALANCED LOADS

[75] Inventors: Geoffrey M. Smith, Reisterstown, Md.; Thomas H. Putman, Penn Hills Township, Allegheny County, Pa.; Eric J. Stacey, Penn Hills Township, Allegheny County, Pa.; Laszlo Gyugyi, Penn Hills Township, Allegheny County, Pa.

[73] Assignee: Westinghouse Electric Corp., Pittsburgh, Pa.

[21] Appl. No.: 543,984

[22] Filed: Jun. 26, 1990

[51] Int. Cl.$^5$ .......................................... H02M 5/257
[52] U.S. Cl. ..................................... 363/161; 363/50; 361/77; 361/84
[58] Field of Search ....................... 363/41, 50, 51, 58, 363/160, 161, 162, 159; 361/76, 77, 84, 85

[56] References Cited

U.S. PATENT DOCUMENTS

| | | | |
|---|---|---|---|
| 3,740,638 | 6/1973 | Thorborg | 363/2 |
| 3,768,001 | 10/1973 | Thorborg | 363/71 |
| 4,312,030 | 1/1982 | Byers | 363/41 |
| 4,439,823 | 3/1984 | Gyugyi et al. | 363/161 |
| 4,652,989 | 3/1987 | Kurosawa et al. | 363/161 |
| 4,669,024 | 5/1987 | Stacey | 361/85 |

Primary Examiner—Peter S. Wong
Attorney, Agent, or Firm—R. P. Lenart

[57] ABSTRACT

A current fed unrestricted frequency converter (UFC) for supplying power with balanced voltages to a three-phase unbalanced load generates two sets of existence functions for controlling the switching matrices of the UFC to generate positive and negative sequence current components in the load. Existence function generators generating the positive and negative sequence existence functions are phase locked, respectively, to a positive sequence reference signal generated by a clock and a negative sequence reference signal derived by circuits which monitor the negative sequence voltage in the load. Select circuits alternately gate the positive and negative sequence existence functions to the UFC switching matrices in proportion to the detected magnitude of the negative sequence voltage in a sense to drive the negative sequence voltage in the load to zero. A neutral forming transformer eliminates any zero sequence voltage in the load so that all that remains is the positive sequence components of voltage which by definition are balanced.

8 Claims, 7 Drawing Sheets

UNRESTRICTED FREQUENCY CONVERTER FOR UNBALANCED LOADS

BACKGROUND OF THE INVENTION

1. Field of the Invention

This invention is directed to frequency converters which convert multiphase electrical power of one frequency to multiphase power of another frequency. More particularly, it is directed to such frequency converters for delivering multiphase power to unbalanced multiphase loads.

2. Background Information

There are many applications where it is desirable to have multiphase electric power at a controlled frequency. These applications include generating multiphase power of constant frequency from a variable frequency source, generating variable frequency power from a constant frequency source, and applications where the source and load frequency vary. One application of the first type is an airborne power generating system where electrical power of a fixed frequency is generated from the output of a generator which is driven at a variable speed dependent upon the speed of the aircraft engine.

U.S. Pat. No. 4,439,823 discloses a multiphase unrestricted frequency converter (UFC) fed by a current source such as a synchronous generator driven at a variable frequency to supply power at a constant frequency to a multiphase load having the impedance characteristics of a voltage source. Bidirectional switches in the frequency converter are connected directly between each phase of the current source and corresponding phases of the load. Even though more than one source phase is supplying power to an output phase at the same time, no input or output filters or interphase transformers are required because currents applied to the output lines simultaneously are added together to generate the particular output phase current. This arrangement works fine when the impedances of the plural phases of the load are balanced. As long as the output impedances are balanced, the output voltages are balanced. However, unequal load impedances result in unequal load output voltages. Present state-of-the-art voltage control methods do not apply to the current fed unrestricted frequency converter, because they require voltage source inputs.

There is a need therefore for a current fed unrestricted frequency converter which can supply current from a multiphase current source to a multiphase voltage source type load directly and maintain balanced voltages on the load despite imbalances in load impedance.

SUMMARY OF THE INVENTION

This and other needs are satisfied by the invention which is directed to a current fed unrestricted frequency converter which senses the negative sequence component of voltage in the unbalanced load and controls the switches of the converter to gate portions of each phase of the multiphase current to the unbalanced load in a repetitive pattern which reduces the negative sequence voltage component in the load to substantially zero. The zero sequence component is eliminated such as by a neutral forming transformer connected across the load so that only positive sequence voltage components remain in the load, which by definition are balanced.

The negative sequence voltage component is eliminated by alternately gating positive sequence current components and negative sequence current components to the unbalanced load in a proportion which eliminates the negative sequence voltage The UFC control generates two complete sets of existence functions for controlling the converter switches: one for the positive sequence current components and the other for the negative sequence current components. Selection circuits gate the negative sequence existence functions to the switches for portions of successive intervals determined by the magnitude of the sensed negative sequence voltage, and gate the positive sequence existence function to the UFC switches for the remainder of each interval. The positive sequence existence functions are phase-locked to a positive sequence reference sine wave. Similarly, the negative sequence existence functions are phase-locked by a phase-lock loop to a negative sequence reference sine wave which is derived from the sensed negative sequence voltage and which is phase related to the positive sequence reference sine wave.

Unique circuits for generating the instantaneous negative sequence component of the load voltage include circuits generating instantaneous real and imaginary components of the negative sequence load voltage and additional circuits which generate signals which are the square of the real and imaginary components. These latter signals are applied to regulators which supply current references to the UFC control in a sense which tends to drive the negative sequence load voltage toward zero The rectangular component outputs from the regulators are converted to polar coordinate signals for use by the UFC control by a rectangular to polar converter.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENT

Figure 1:
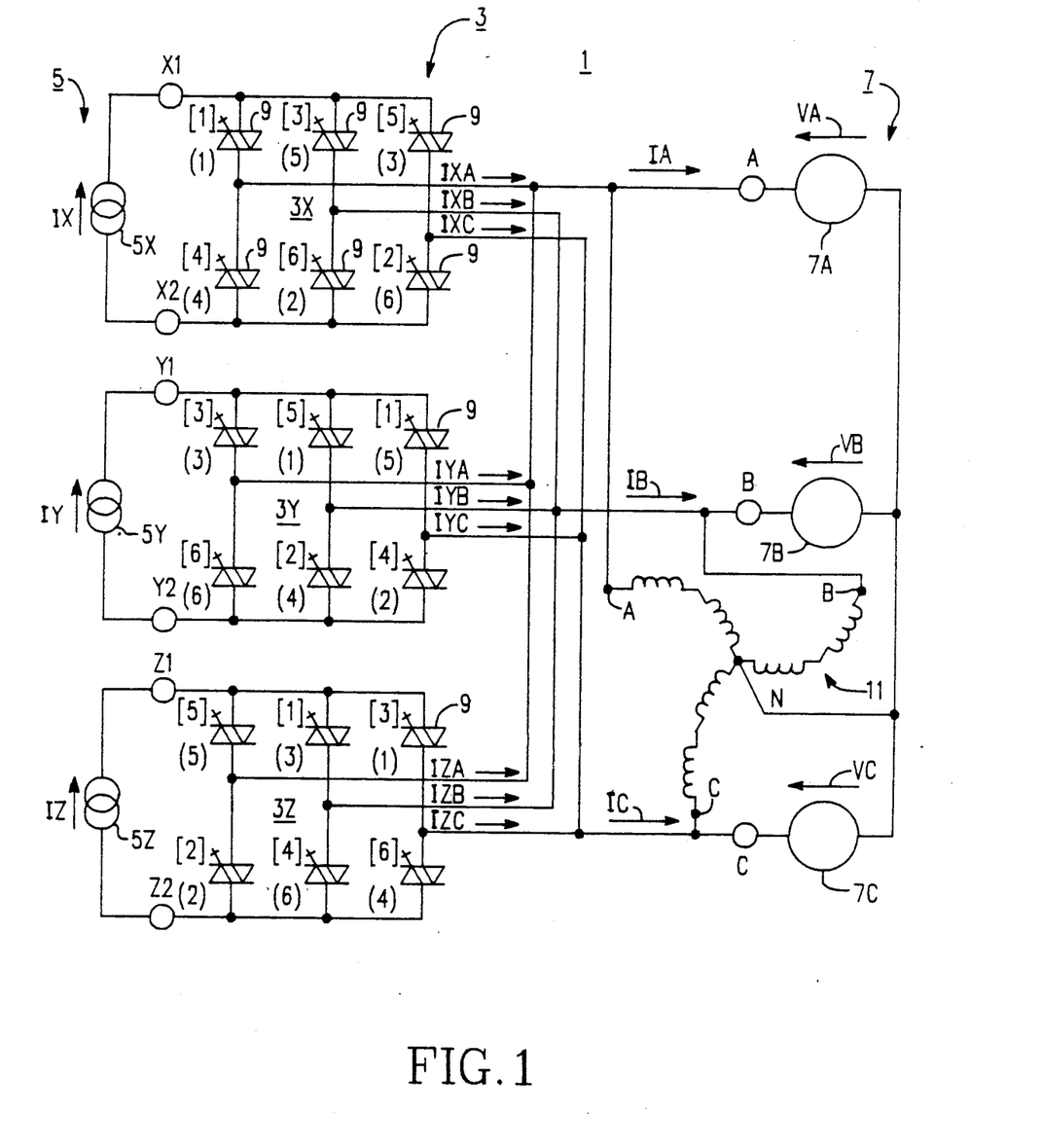
FIG. 1 is a schematic diagram of the power circuit of an electrical system incorporating the invention.

FIG. 1 illustrates a schematic power circuit of an electrical system 1 incorporating a three-phase unrestricted frequency converter (UFC) 3 in accordance with the invention which is fed by a three-phase variable frequency current source 5 and which generates current at another frequency for a three-phase voltage source-type output 7. While the present invention has many applications, it will be described as applied to an electrical system for an aircraft wherein the current source 5 is a synchronous generator driven at a variable frequency by the aircraft engine. The UFC 3 converts the three-phase power provided by the synchronous generator at variable frequency into a fixed frequency, typically 400 Hz, output frequency for energizing the three-phase voltage source type load 7. It will be assumed that the three-phase load 7 is unbalanced. It should be understood that the invention could also be used with UFCs which convert power supplied at a fixed frequency to a variable frequency and which convert power of one variable frequency to another variable frequency.

The three phases 5X, 5Y and 5Z of the current source feed input currents IX, IY, and IZ to three six-pulse switching circuits, 3X, 3Y, and 3Z of the UFC, respectively. Each of the switching circuits, 3X, 3Y, and 3Z includes six bidirectional switches 9 which are connected in pairs to each of three phases 7A, 7B, and 7C of the voltage source type output circuit 7. It will be noted that each of the switching circuits is connected directly to each phase of the voltage source type output 7 so that the three phase currents of the output 7 are determined directly by the sum of the currents generated by the UFC. For instance, the current, IA of phase A of the voltage source type output 7 is equal to the sum of the currents IXA, IYA and IZA generated by the three switching circuits 3X, 3Y and 3Z, respectively, of the UFC. The switches 9 are controlled in a manner to be seen to connect portions of the input currents to each output in a sequence which produces a constant frequency current at the output. Without the invention, the unequal load impedances would produce unbalanced output voltages VA, VB and VC.

During steady state conditions, an unbalanced three-phase voltage set can be characterized by positive, negative, and zero sequence components using symmetrical component theory. To produce balanced output voltages, the negative sequence and zero sequence components must be eliminated. A neutral-forming transformer 11 excludes the zero sequence component. With proper positive and negative sequence currents supplied to the unbalanced load 7, only positive sequence and, therefore, balanced voltages will result.

Figure 2:
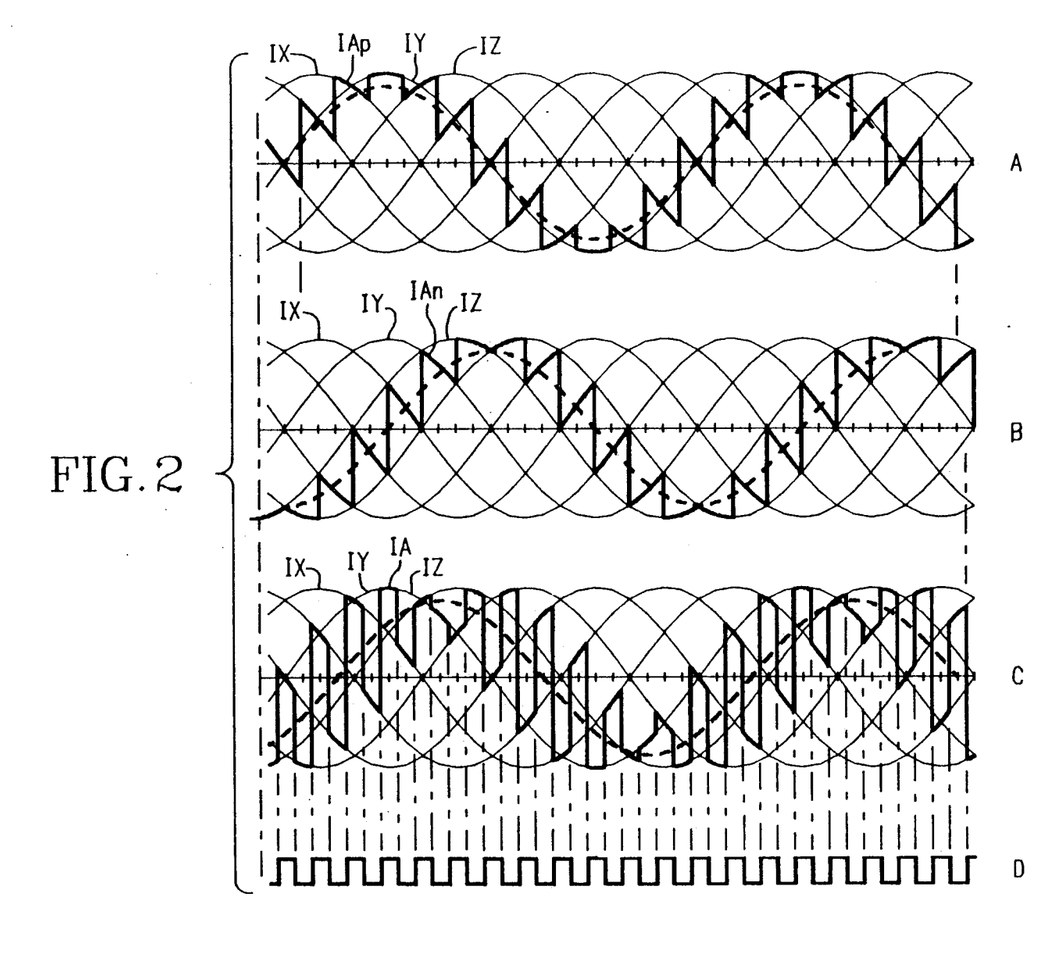
FIG. 2 is a wave form diagram illustrating the operation of the invention.

Since the UFC3 fabricates output currents from the input current sources, the switches 9 can be manipulated to produce positive sequence currents in the load 7. It can also produce negative sequence currents in the load. The novel control feature of the present invention produces positive and negative sequence currents alternatively in a time proportioned and phase related manner which results in balanced output voltages FIGS. 2 illustrates the effects of this alternating control on one output current IA. The A set of traces of FIG. 2 shows converter output current IA when operating at 100% positive sequence current. The switching circuits 3X, 3Y and 3Z sequentially gate components of the input currents IX, IY, and IZ to generate the positive sequence output current $IA_p$. The B set of traces shows the switching of components of the input currents to generate a negative sequence current $IA_n$. The C set of traces shows the current IA made up of 50% positive sequence components and 50% negative sequence components. The dashed lines in sets of traces A through C in FIG. 2 depict the fundamental components of the respective currents. Trace D of FIG. 2 illustrates the logic signal used to generate the positive and negative sequence components of the output current, with the high state producing the positive sequence currents The logic signal is shown by way of example for the 50% duty cycle for the current IA generated in the C set of traces. As will be noticed from trace sets A and B of FIG. 2, the negative sequence components for each phase of the input current in the example lag the positive sequence components by 90 degrees.

Returning to FIG. 1, the switching sequences for the switches 9 in each of the switching circuits 3X, 3Y and 3Z are shown by the numerals in parentheses (..) for positive sequence operation and by the numerals in brackets, [..], for negative sequence operation.

Figure 3:
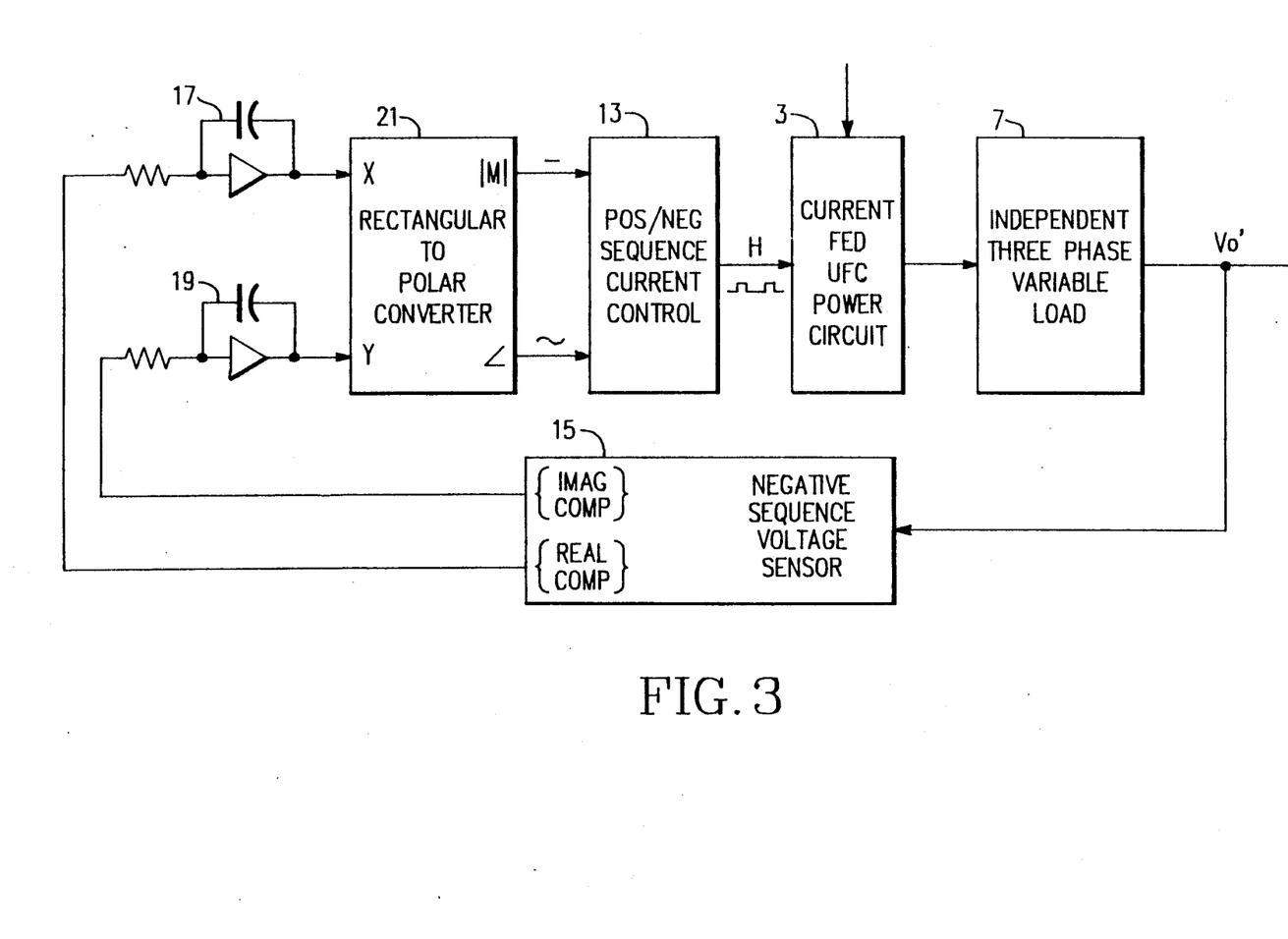
FIG. 3 is a block diagram of the control system for the unrestricted frequency converter which forms part of the electrical system shown in FIG. 1.

A block diagram of the control system for operating the UFC to feed positive and negative sequence current components to the unbalanced load is illustrated in FIG. 3. Firing signals, H, for the switches in the power circuit 3 of the current fed UFC are generated by a positive/negative sequence current control 13 to operate the switches 9 in the power circuit 3 to feed the proper proportion of positive and negative sequence components of input current to the variable load 7. A feedback loop for controlling the negative sequence components of the load voltages includes a negative sequence voltage sensor 15 which monitors the load voltages VA, VB and VC and generates instantaneous values of real and imaginary components, REAL COMP and IMAG COMP, of the negative sequence load voltage. These real and imaginary components of the negative sequence voltage are applied to regulators 17 and 19, respectively, in the form of integrators which generate outputs, X and Y, respectively. These signals X and Y which are in rectangular form are converted to polar form for use by the positive/negative sequence current control 13 by a rectangular to polar converter 21.

The sensor 15 employs the following technique to measure the instantaneous value of the negative sequence component of the voltage in the load 7. It is known that the sequence components of any three-phase set of voltages can be uniquely represented by the complex expression:

$$V_1 = \tfrac{1}{3}(V_a + aV_b + a^2V_c) \qquad \text{Eq. 1}$$

where $V_a$, $V_b$ and $V_c$ are instantaneous values of the threephase voltages, and $$a = \exp\left(j\frac{2\pi}{3}\right) \qquad \text{Eq. 2}$$

Carrying out the algebra, $$V_1 = [1/3V_a - 1/6V_b - 1/6V_c] + j\left[\frac{1}{2\sqrt{3}}(V_b - V_c)\right] \qquad \text{Eq. 3}$$

$$= V_R + jV_M \qquad \text{Eq. 4}$$

Figure 4:
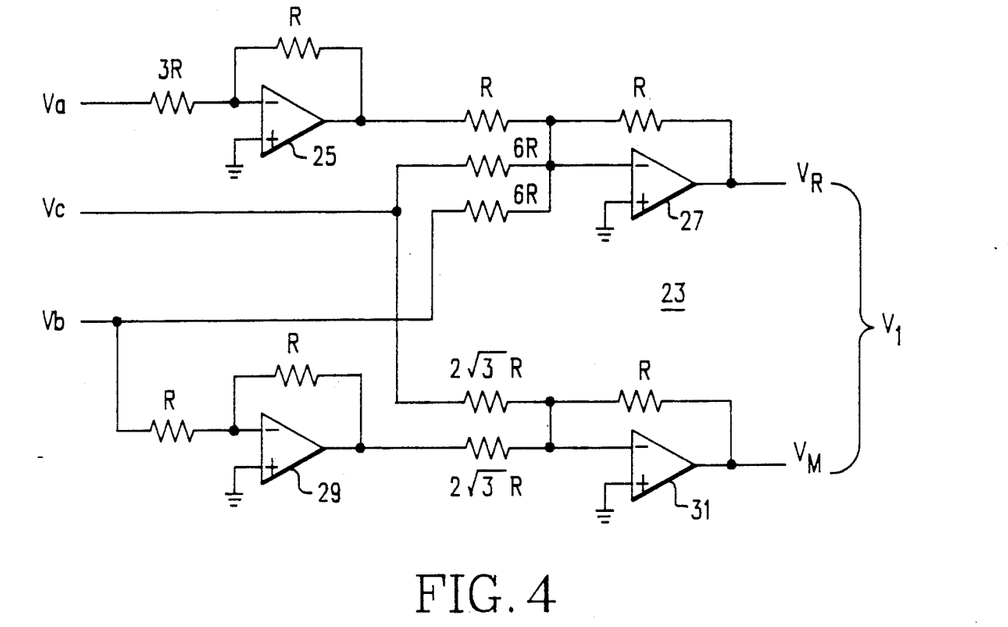
FIG. 4 is a circuit for generating real and imaginary portions of negative sequence voltage generated in the unbalanced load in the electrical system of FIG. 1.

The function expressed by equations 3 and 4 can be implemented by the analog circuit 23 illustrated in FIG. 4. A first gain amplifier 25 having an input resistor with three times the value of the amplifier feed back resistor, generates the first term of equation 4. A second gain amplifier 27 with input resistors of proper value sums the output of amplifier 25 with the proper proportions of $V_b$ and $V_c$ to generate $V_R$. Third and fourth gain amplifiers 29 and 31 produce the output $V_M$ from the instantaneous values of $V_a$, $V_b$ and $V_c$ of the load voltages.

$$g = V_1^2 \qquad \text{Eq. 5}$$

$$= (V_R^2 - V_M^2) + j(2V_R V_M) \qquad \text{Eq. 6}$$

Figure 5:
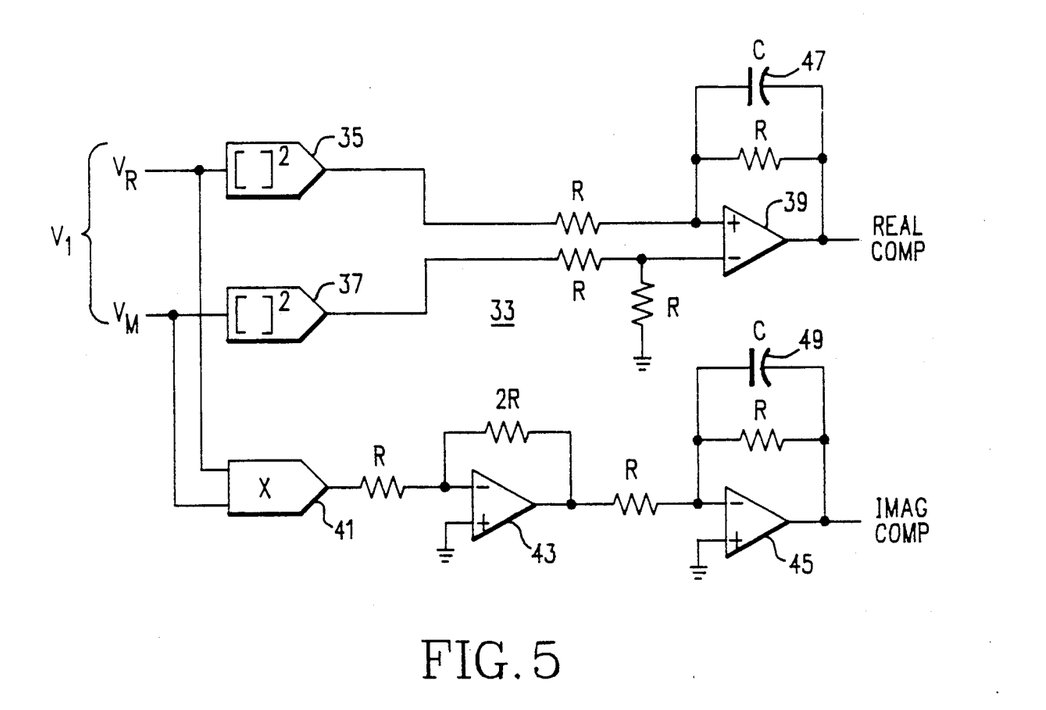
FIG. 5 is a schematic diagram of a circuit for generating negative sequence voltage control signals from the circuit of FIG. 4.

The function expressed by equation 6 can be implemented by the analog circuit 33 of FIG. 5. Squaring circuits 35 and 37 and gain amplifier 39 generate the REAL COMP output of sensor 15 while multiplier 41 and gain amplifiers 43 and 45 produce the IMAG COMP.

For an input which consists solely of positive sequence components:

$$V_1 = V_p = V \exp[j(\omega t + \phi_p)] \qquad \text{Eq. 7}$$

where $V_p$ is the positive sequence component, $\omega$ is the angle frequency of $V_p$ and $\phi_p$ is the phase offset of the positive sequence component relative to a zero reference, so that:

$$g = V^2 \exp[j(2\omega t + 2\phi_p)] \qquad \text{Eq. 8}$$

The resulting real and imaginary components are sine functions at double the input frequency.

Now assume that a small negative sequence disturbance, $\Delta V_1$, is added to the basic positive sequence voltage.

$$V_1' = V_1 + \Delta V_1 \qquad \text{Eq. 9}$$

$$= V \exp[j(\omega t + \phi_p)] + \Delta V \exp[-j(\omega t + \phi_n)] \qquad \text{Eq. 10}$$

where $\phi_n$ is the offset of the negative sequence component phase angle with respect to the zero reference. Then:

$$g = V_1'^2 = V_1^2 + 2V_1\Delta V_1 + \Delta V_1^2 \qquad \text{Eq. 11}$$

The two squared terms produce double frequency components which can be filtered out by filter capacitors 47 and 49 across amplifiers 39 and 45, respectively. What remains is:

$$2V_1\Delta V_1 = 2V\Delta V[\cos(\phi_p - \phi_n) = j\sin(\phi_p - \phi_n)] \qquad \text{Eq. 12}$$

Thus, the filtered magnitudes of the real and imaginary components of the output of sensor 15 give an indication of the magnitude and angle of the negative sequence voltage in rectangular form.

As mentioned above, the object of the invention is to reduce the negative sequence voltage in the unbalanced load to zero. Hence, the real and imaginary components of the negative sequence voltage are fed into the integrating amplifiers 17 and 19 in such a way that each output operates on the UFC to reduce its component to zero.

Figure 6:
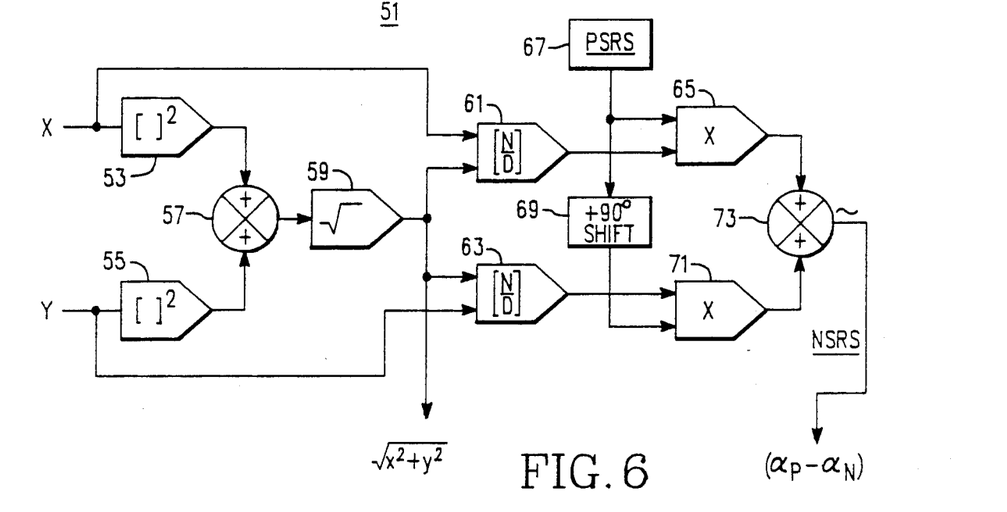
FIG. 6 is a circuit for converting the rectangular coordinate signals generated by the circuit of FIG. 5 into polar coordinate signals.

The output of the regulators 17 and 19 which are current signals are used by the positive/negative sequence control 13. The positive/negative sequence current control 13 varies the relative amplitude and phase angle of the positive and negative sequence currents generated by the switching of the UFC. The outputs of the regulators 17 and 19 are current signals in rectangular form, however, the inputs to the positive/negative sequence current control 13 which controls power circuit currents, require polar information. Therefore, the regulator outputs X and Y are converted from rectangular to polar form by the rectangular to polar converter 21. A suitable analog computation circuit 51 for the rectangular to polar converter 21 is shown in FIG. 6. The outputs X and Y of the integrating regulators are each squared by a squaring circuit 53 and 55, respectively and the results are added in summing circuit 57. The square root of the sum is generated by the circuit 59 to produce a magnitude signal I which is equal to the square root of X squared plus Y squared. X and Y, respectively, are divided by the output of the square root circuit 59 in dividers 61 and 63. The output of divider 61 is multiplied in multiplier 65 by a positive sequence reference signal PSRS generated by a clock driven reference signal generator 67. The positive sequence reference signal is shifted 90 degrees in the phase shifter 69 and multiplied in multiplier 71 by the output of divider 63. The outputs of the multipliers 65 and 71 are added in summer 73 to produce a negative sequence reference signal NSRS. The magnitude output of the circuit 51 is a dc voltage proportional to the ratio of the negative to positive sequence current. The angle output, NSRS, is a sine wave. The phase relationship between the positive sequence reference sine wave, PSRS, and the negative sequence reference sine wave, NSRS, is the phase angle between the positive and negative sequence current on the phase A output.

Figure 7:
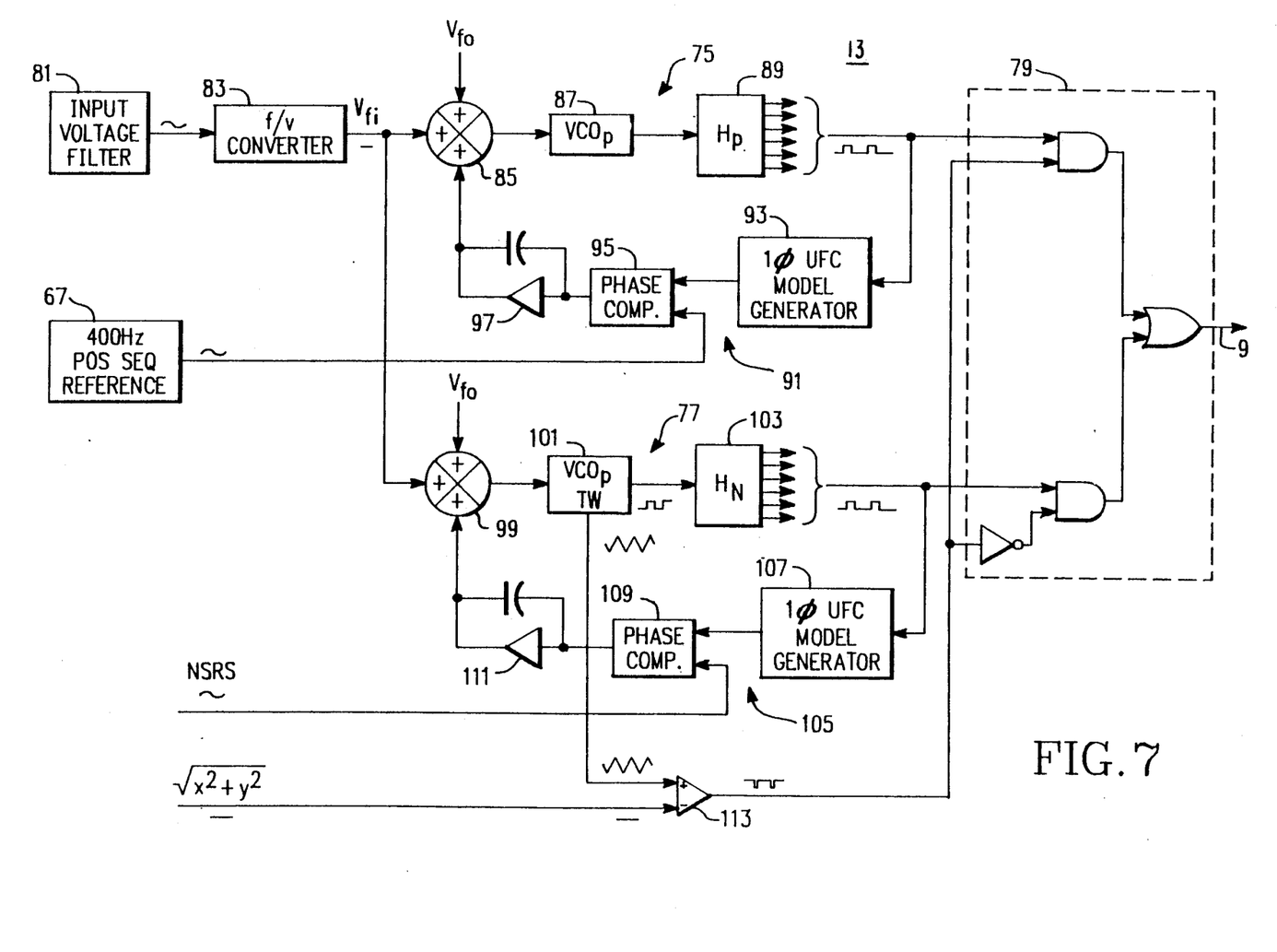
FIG. 7 is a schematic diagram of the positive/negative sequence current control which forms part of the control system of FIG. 3.

The positive/negative sequence current control 13, shown in FIG. 7, consists of positive and negative sequence function generators 75 and 77, respectively, each of which is phase locked to produce 400 Hz output current from the UFC over a range of input frequencies and a set of select gates 79 for switching from one set of existence functions to the other. The switching frequency of each of the existence function generators 75 and 77 is determined principally by a feed forward circuit which converts the input voltage to a dc level proportional to the fundamental input frequency, and sums it with a constant level with the same scale factor representing the output frequency, 400 Hz. Thus, the input voltage from filter 81 is converted to a dc voltage $V_{fi}$ in frequency to voltage converter 83. In the case of the positive sequence existence function generator 75, this dc reference signal $V_{fi}$ is summed with an output frequency reference signal $V_{of}$ in the summing junction 85. The resulting dc level represents the basic switching frequency. This dc signal feeds a voltage controlled oscillator (VCO) 87 which produces a clocking pulse train at the desired switching frequency, 6($f_i f_o$) a static shift register 89 generates the six base existence functions required to control the switches 9 of the UFC.

These functions or control signals are distributed to the converter switches 9 by way of the select gates 79, in such a manner as to produce positive sequence currents at the output.

To obtain more accurate regulation of the output frequency and to control the phase relationship of the positive sequence output current with respect to a 400 Hz crystal reference generated by the positive sequence reference generator 67, a phase locked loop 91 is added. The existence functions generate a model of the phase A output voltage in the one phase UFC model generator 93. The model generator 93 can be a ROM which stores successive values of the one phase reference sine wave at addresses which are accessed sequentially using the existence functions. The phase A model voltage is phase compared to the 400 Hz positive sequence reference signal in a phase comparator 95. The comparator output is fed to an error integrator amplifier 97. The amplifier 97 is connected to the frequency summing junction 85 in such a manner as to correct frequency and phase errors. The negative sequence firing control signals are generated in the same manner as the positive sequence signals employing the negative sequence existence function generator 77. Again, the dc input frequency reference signal $V_{fi}$ is summed with the dc output frequency reference, $V_{of}$ in a frequency summing junction 99 with the output being applied to a negative sequence VCO 101 to generate the desired switching frequency $6(f_i+f_0)$. This pulse train is applied to static shift register 103 to generate the six base existence functions for the negative sequence current components. These firing control signals for the switches 9 in the UFC3 are also applied to the select gates 79. The phase locked loop 105 for the negative sequence existence function generator 77 includes the one phase UFC model generator 107 which generates the phase A reference signal from the existence functions generated in shift register 103 This phase A reference signal is phase compared in the phase comparator 109 with the negative sequence reference signal, NSRS, generated by the rectangular to polar converter circuit 51. The output of the phase comparator 109 is applied to the error integrating amplifier 111 which is connected to the frequency summing junction 99 in such a manner as to correct frequency and phase errors in the negative sequence existence functions.

Figure 8:
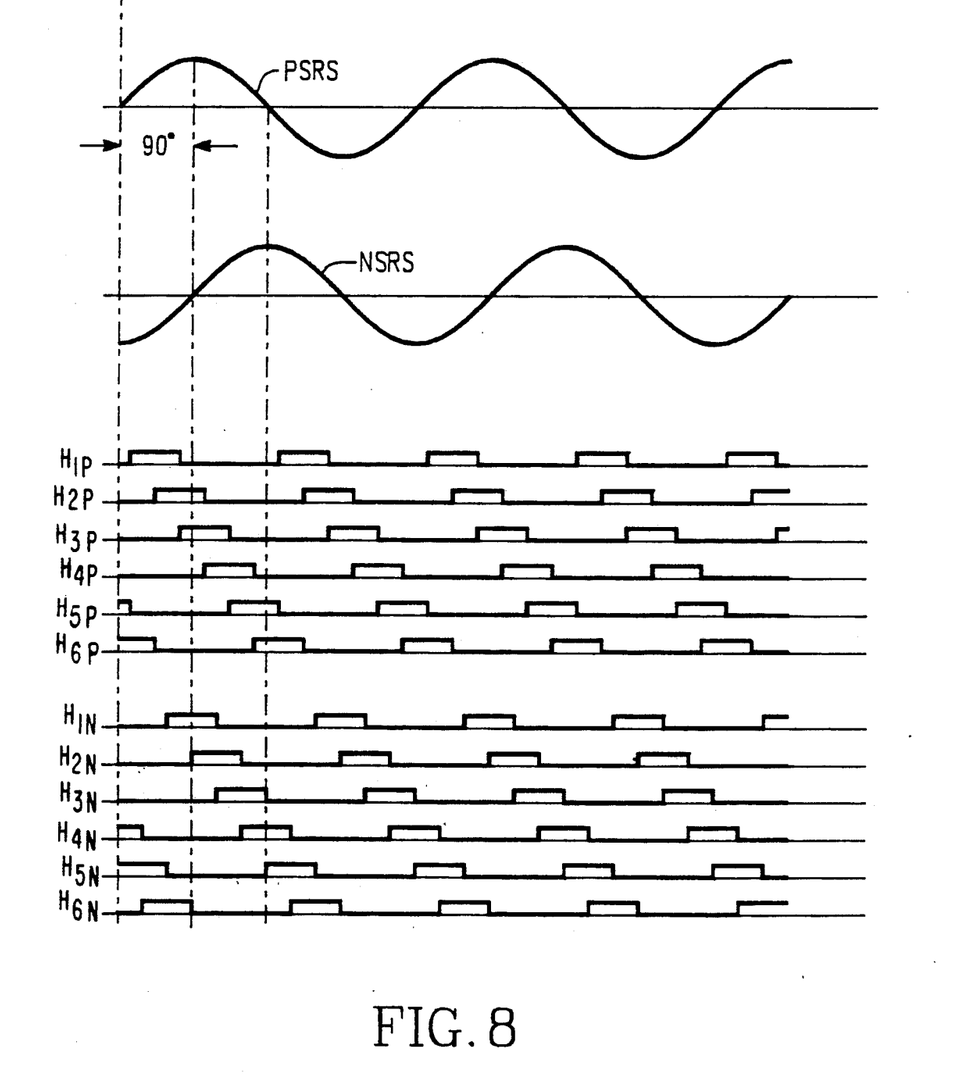
FIG. 8 depicts wave form diagrams illustrating the reference signals and existence functions generated by the positive/negative sequence current control shown in FIG. 7.

FIG. 8 illustrates the positive and negative sequence sets of base existence functions generated by the control 13 and their phase relationship given the positive sequence sine wave reference, PSRS, and the negative sequence reference, NSRS, and assuming a 1200 Hz input frequency. This figure illustrates a case where the positive sequence currents lead the negative sequence currents by 90 degrees for the phase shown. The signals $H_{1P}$ through $H_{6P}$ represent the fire control signals applied to the switches 9 for generating positive sequence current components in the output and the signals $H_{1N}$ through $H_{6N}$ represent the fire control signals for the negative sequence components. These signals $H_{1P}$ to $H_{6P}$ are applied to the switches 9 in FIG. 1 with the corresponding numeral in parentheses (..), respectively, and the signals $H_{1N}$ to $H_{6N}$ are similarly applied to the switches with the corresponding numerals in brackets [..]. When negative sequence current is required, the select gates 79 connect the negative sequence function to the switches 9 for a portion of time and connect the positive sequence existence functions to the switches 9 for the remainder of the time. The ratio of the negative sequence time to positive sequence time determines the proportion of the two component amplitudes in the output current.

The timing of proportioning is accomplished using a triangular wave obtained from VCO 101 in the negative sequence function generator 77 of FIG. 7. The negative sequence magnitude reference, square root of (X squared plus Y squared), generated by the rectangular to polar converter circuit 51 in FIG. 6 is compared to a triangular wave generated by the negative sequence VCO 101 in a comparator 113 shown in FIG. 7. The gate control signal G generated from the triangular wave reference and the negative sequence magnitude signal is used to control the select gates 79.

Figure 9:
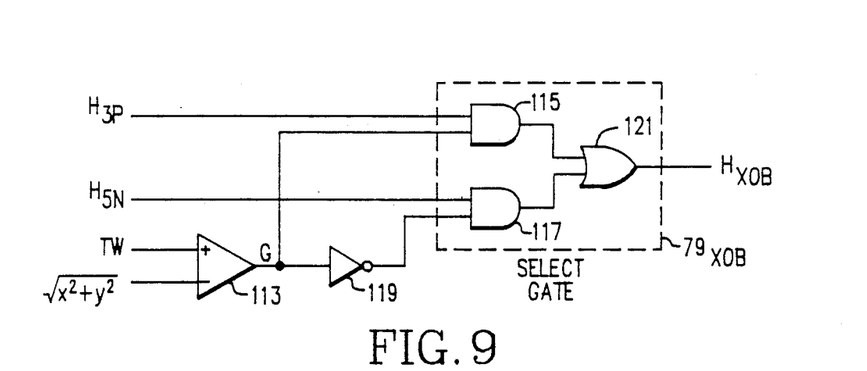
FIG. 9 is an example of one of the plurality of select gates which forms part of the positive/negative sequence current control shown in FIG. 7.

FIG. 9 illustrates the circuit arrangement for the upper (odd) switch 9 in the middle pole of the 3X bridge shown in FIG. 1 which connects "positive" IX current to phase 7B of the load. The select gate $79_{XOB}$ includes an AND gate 115 to which is applied the existence function $H_{3P}$ from the positive sequence existence function generator 75 and the gate control signal G from the comparator 113. A second AND gate 117 in the select gate $79_{XOB}$ is fed by the existence function, $H_{5N}$ from the negative sequence existence function generator 77, and the inverted gate control signal G applied through an inverter 119. The outputs of the AND gates 115 and 117 are applied to an OR gate 121 which generates the control signal $H_{XOB}$ which is applied to the upper middle switch 9 in the switching circuit 3X.

Figure 10:
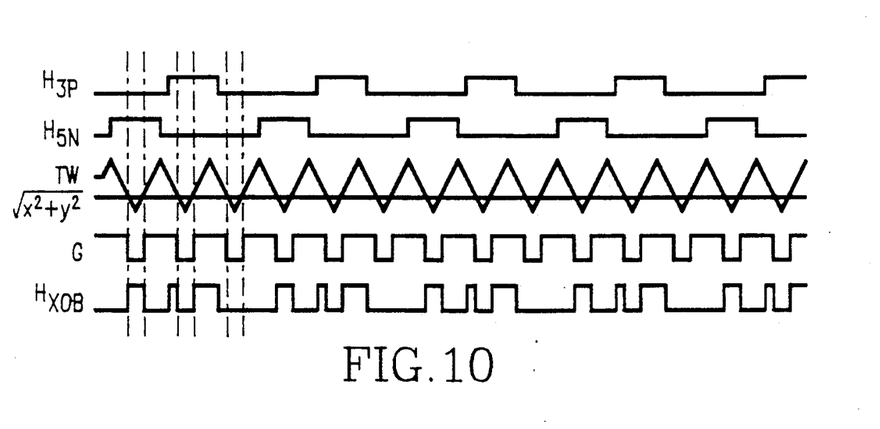
FIG. 10 illustrates wave forms generated by the select gate of FIG. 9.

Exemplary waveforms for the various signals illustrated in FIG. 9 are shown in FIG. 10. The comparator 113 is used for the select gates 79 for all oddnumbered existing functions. The even-numbered existence functions are generated using an inverted triangular wave from VCO 101 and the magnitude signal square root (X squared plus Y squared) from the rectangular to polar converter circuit 51. A select gate 79 is required for each of the power switches 9 in the switching circuits 3X, 3Y and 3Z.

Since the positive sequence existence functions are phase locked to the positive sequence reference sine wave, PSRS, and the negative existence functions are tied to the negative sequence reference sine wave, NSRS, the phase angle relationship of the negative sequence existence function to the positive sequence existence function, and therefore negative sequence current to positive sequence sequence current in phase A, is the same as is the negative sequence reference sine wave to the positive sequence reference sine wave. In the example shown in FIG. 10, the positive set leads the negative set by 90 degrees. This can also be seen in the wave forms in FIG. 8. The phase of $H_{3P}$ and $H_{5N}$ will vary according to the phase relationship of the references to the two phase lock loops. However, the phase relationship of the triangular wave to the negative existence functions remains fixed.

In summary, the positive/negative sequence current control 13 modifies the switching patterns in the UFC 3 to produce positive and negative sequence output currents in the proportion indicated by the relative magnitude signal from the rectangular to polar signal converter 21 with the same phase angle relationship on phase A as do the negative sequence reference sine wave and the positive sequence reference sine wave. The regulators 17 and 19 adjust these currents in such a manner as to produce zero amount of negative sequence voltage on the output 7. Connecting a neutral forming transformer 11 to the output 7 eliminates the zero sequence component of voltage. All that remains is positive sequence voltage, which is by definition balanced.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A current fed unrestricted frequency converter for supplying multiphase current of one frequency to a multiphase unbalanced voltage source type load from a multiphase current source having another frequency while maintaining balanced voltages on said multiphase unbalanced voltage source type load, said converter comprising:
   an array of switches connecting each phase of said multiphase current source to each phase of said multiphase unbalanced voltage source type load;
   sensing means sensing a negative sequence component of voltage in said multiphase unbalanced voltage source type load;
   control means responsive to said sensing means operating said switches to gate portions of each phase of said multiphase current to said multiphase unbalanced voltage source type load in a repetitive pattern which reduces said negative sequence voltage component in said load to substantially zero; and
   means connected to said multiphase unbalanced voltage source type load to substantially eliminate any zero sequence voltage in said multiphase unbalanced voltage source type load.

2. The converter of claim 1 wherein said means to substantially eliminate any zero sequence voltage in said multiphase unbalanced voltage source type load comprises a multiphase neutral forming transformer connected to each phase of said multiphase unbalanced voltage source type load.

3. The converter of claim 1 wherein said control means comprises:
   a first existence function generator generating positive sequence existence functions for operating said switches to gate positive sequence current components to said multiphase unbalanced voltage source type load;
   a second existence function generator generating negative sequence existence functions for operating said switches to gate negative sequence current components of said multiphase current to said multiphase unbalanced voltage source type load; and
   selection means responsive to said sensing means sensing said negative sequence voltage to alternately apply said positive and negative existence functions to said switches to gate positive and negative sequence current components to said multiphase unbalanced voltage source type load in a proportion which substantially eliminates said negative sequence voltage in said multiphase unbalanced voltage source type load.

4. The converter of claim 3 including means generating a positive sequence reference sine wave, and wherein said first existence function generator includes a positive sequence phase lock loop locking the phase of the positive sequence existence functions to said positive sequence reference sine wave, wherein said sensing means includes means generating a negative sequence reference sine wave, and wherein said second existence function generator includes a negative sequence phase lock loop locking said second existence functions to said negative sequence reference sine wave.

5. The converter of claim 4 wherein said means generating said negative sequence reference sine wave includes means relating the phase of the negative sequence reference sine wave to the phase of the positive sequence reference sine wave.

6. The converter of claim 3 wherein said sensing means includes means generating a negative sequence current magnitude reference signal from the sensed negative sequence voltage in said multiphase unbalanced voltage source type load and wherein said selection means includes gate control means responsive to the negative sequence current magnitude signal to repetitively for successive intervals of time gate said negative sequence existence functions to said switches to operate said switches to apply said negative sequence current components to said multiphase unbalanced voltage source type load for a portion of each interval determined by the magnitude of said negative sequence current magnitude signal, and to gate said positive sequence existence functions to said switches to operate said switches to apply said positive sequence current components to said multiphase unbalanced voltage source type load for the remainder of each interval.

7. The converter of claim 6 wherein the second existence function generator includes a voltage controlled oscillator which generates a repetitive time varying reference signal phase locked to the phase angle of said negative sequence sine wave and wherein said selection means includes means comparing said time varying reference signal to said negative sequence current magnitude signal to determine the portion of each interval to gate said negative sequence existence functions to said switches.

8. The converter of claim 7 wherein said multiphase unbalanced voltage source type load is a three-phase load, wherein said multiphase currents are three-phase currents and said negative sequence voltage sensing means includes first circuit means summing one third of an instantaneous magnitude of a first voltage of the three-phase load voltage and minus one-sixth an instantaneous value of each of second and third load voltages to generate a signal representative of a real component of the negative sequence voltage and means generating a signal equal to $1/(2\sqrt{3})$ of the instantaneous value of the second voltage minus the third voltage as an imaginary component of said negative sequence voltage.

* * * * *